Figure 1:
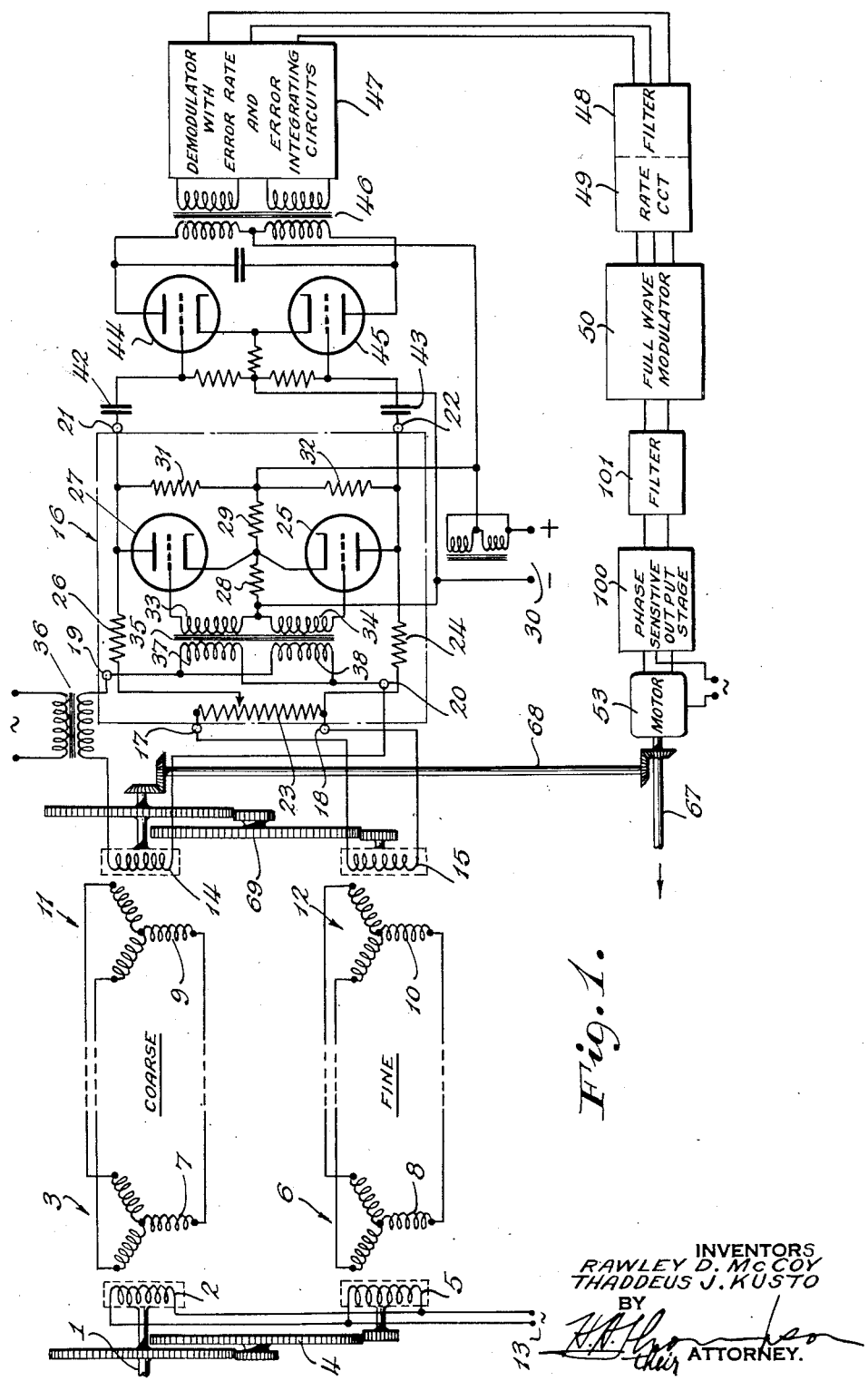

INVENTORS
RAWLEY D. McCOY
THADDEUS J. KUSTO
BY
ATTORNEY

Patented Dec. 2, 1952

2,620,441

UNITED STATES PATENT OFFICE 2,620,441

ELECTRONIC SIGNAL MIXER

Rawley D. McCoy, Bronxville, and Thaddeus J. Kusto, New York, N. Y., assignors to The Sperry Corporation, a corporation of Delaware Application October 24, 1946, Serial No. 705,292

4 Claims. (Cl. 250—27)

Our invention relates generally to an improved signal voltage mixing circuit adapted to provide a voltage output having components corresponding to a pair of signal voltage inputs. Our invention particularly relates to a signal mixing circuit for combining fine and coarse error signal voltages and one which is particularly adapted for use in a control circuit for a servomotor.

Fine and coarse error signal systems are ordinarily employed in servomotor systems to provide a close and quite accurate control over the servomotor so that, for example, the load shaft or positionable object driven thereby will follow an input shaft or reference member with extremely small lag or lead therebetween. Ordinarily, fine and coarse error systems, such as those herein illustrated and hereinafter described, respectively include a signal transmitter and a signal receiver or transformer. The transmitter of the coarse system is ordinarily connected directly with the data input or with the reference member so that the rotor of the transmitter rotates in a 1:1 ratio with respect thereto. The rotor of the fine transmitter, on the other hand, is rotated in some fixed, higher ratio with respect thereto, such as, for example, a 36:1 or in any other desired ratio with respect to the reference member or input shaft. The coarse signal error voltage derived from the coarse system will therefore vary in amplitude directly with rotation of the input shaft, or, more precisely the amplitude of the voltage envelope of the output voltage of the coarse system will vary in amplitude directly with rotation of the input shaft. The fine error voltage or the voltage envelope of the output voltage of the fine system will vary in amplitude in the adopted ratio as, for example, 36:1 with respect to rotation of the input shaft. These signal voltages are ordinarily supplied to an amplifier which is associated in controlling relationship with the servomotor or other controlled device.

Since fine and coarse error voltages are employed to provide close and accurate tracking of the positionable object, driven by the servo, with the reference member, a control must be exercised over these signal voltages in order that they may be fully utilized under those conditions where their presence is most needed for proper control, and may yet be modified or eliminated under those conditions where their presence would impair the operation of the servo, or, even bring about a reversal of its direction of operation.

In the present application, we have described our invention as embodied in a servomotor control system mainly for exemplary purposes and also as illustrative of the use to which the invention is particularly adapted.

It is the primary object of this invention to provide an improved mixing circuit for a pair of voltages such as those derived from a fine and coarse selsyn data transmission system, the voltages being combined in a predetermined manner.

Another object of this invention resides in providing an electronic mixing circuit in which the output voltage contains components corresponding to a pair of input signal voltages, the magnitude of one of said voltage components which corresponds to a first of said signal voltages being controlled by the other signal voltage.

Another object resides in providing electronic means controlled by one signal voltage for supplying a signal voltage component in the output thereof corresponding to said controlling voltage and which electronic means controls the magnitude of a second signal voltage or a voltage component corresponding thereto in said output.

Another object resides in providing an electronic circuit or electronic means of the foregoing characters which are so arranged as progressively to reduce the magnitude of the signal voltage component in the output corresponding to one signal voltage as the other signal voltage increases.

A still further object resides in providing a mixing circuit comprising electron tube means controlled by one signal voltage for providing a voltage component in the plate circuit thereof corresponding to said one signal voltage and in which a second signal voltage is connected with said plate circuit whereby the output voltage will include components corresponding to both of said signal voltages, said tube means functioning to control the magnitude of both voltage components in said plate circuit.

Another object resides in providing a circuit of the character last above recited in which the electron tube means is so arranged that no voltage component corresponding to the signal voltage applied to the control electrode thereof will appear in the plate circuit or output for values of the voltage applied to said control electrode below a predetermined magnitude.

Another object resides in providing a circuit of the character last above set forth in which the voltage component in the output corresponding to the said second of the pair of signal voltages decreases for values of the first signal voltage above the predetermined magnitude above referred to.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Still another object of this invention resides in providing, in an electronic servomotor controller, an electron or thyratron tube circuit in which the bias and signal potentials are applied in parallel to the control electrode or grid of said tubes; and in providing such a circuit in which the bias voltage is supplied through series condensers which permit parallel grid excitation and at the same time form a shunt for filtering out harmonics.

With the foregoing and still other objects in view, our invention includes the novel elements and the combinations and arrangements thereof described below and illustrated in the accompanying drawings, in which—

Figure 2:
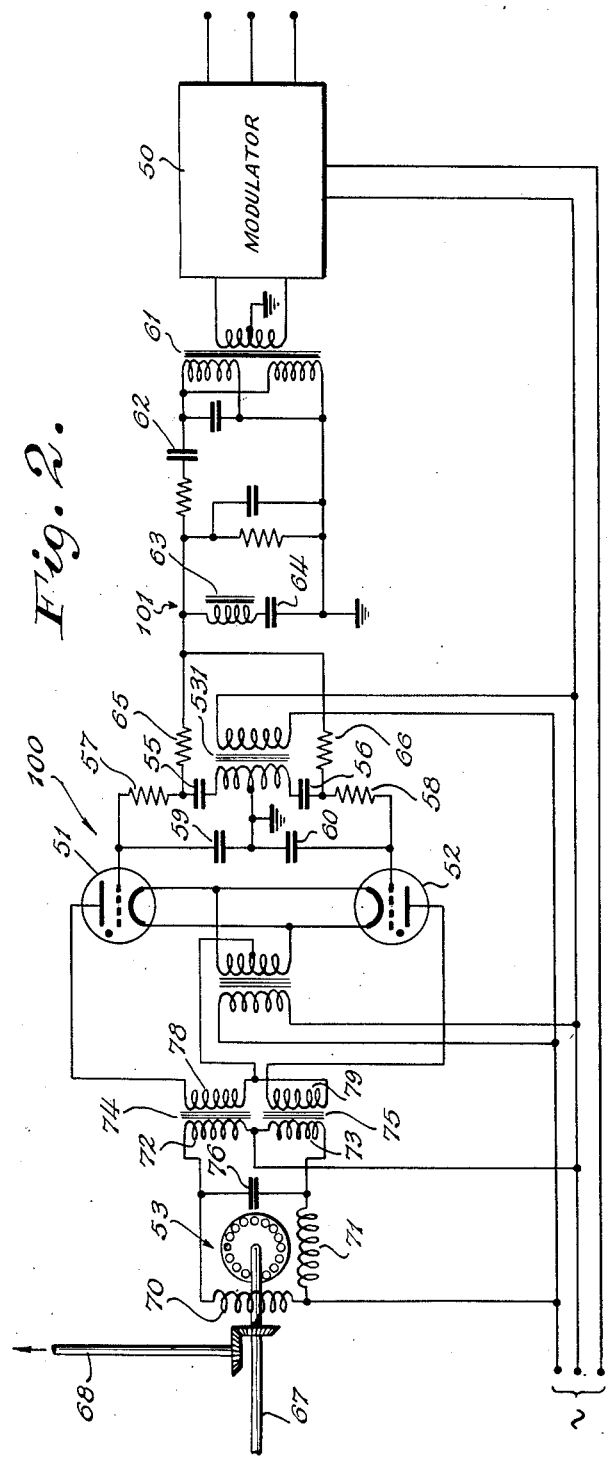
Figure 3:
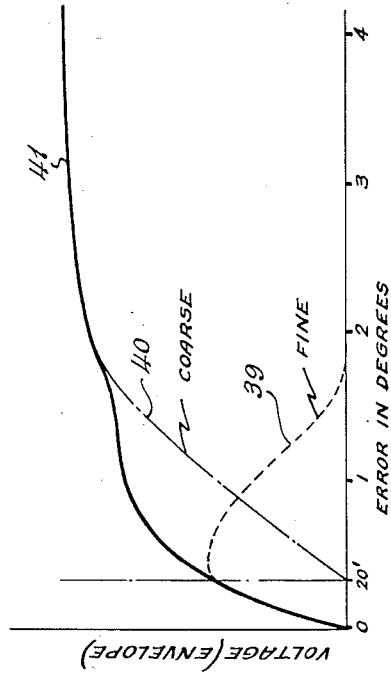

Fig. 1 schematically represents a servomotor control system embodying the preferred form of our signal mixing circuit which is illustrated in the detailed wiring diagram;

Fig. 2 illustrates in greater detail a portion of the control system shown in Fig. 1; and Fig. 3 shows curves representing the voltage components and resultant voltage in the output of our mixing circuit.

Fig. 1 illustrates somewhat schematically a positional control system as illustrative of systems embodying the present invention. In Fig. 1, 1 indicates generally the input shaft with which a reference member may be connected and to which the rotor 2 of the transmitter 3 in the coarse signal system is directly coupled or so coupled thereto that the reference member or shaft 1 and the rotor 2 rotate together. The input shaft 1 is also coupled through a gear train, indicated generally at 4, with the rotor 5 of a transmitter 6 which is the transmitter in the fine signal system. The gear train 4 is designed, as herein assumed for descriptive purposes, to drive the rotor 5 in a ratio of 36:1 with respect to the input shaft or rotor 2 of the coarse transmitter.

The stator windings of the transmitters 3 and 6 as indicated generally at 7 and 8, respectively, are connected together in polycircuit fashion and with the correspondingly disposed and similarly connected stator windings 9 and 10 of the signal transformers 11 and 12. Selsyn or Autosyn type units may be employed as the transmitters and as the receivers or signal transformers in the above-described transmission systems, and it will be understood that where in the following description we may refer to selsyns that we mean to include any suitable type unit which may be employed for the purposes herein specified.

The rotors of the transmitters 3 and 6 are connected across a source of suitable alternating current indicated generally at 13, while the rotors 14 and 15 of the receivers or signal transformers 11 and 12 are connected to supply signal voltages to the mixing and signal voltage control circuit included within the dot-dash line and indicated generally at 16. The output of the fine transmission system or rotor 15 of the signal transformer 12 is connected across the input taps 17 and 18, while the output of the coarse transmission system or rotor 14 of signal transformer 11 is connected across the input terminals 19 and 20.

The output of the voltage mixing circuit will be applied across the terminals 21 and 22. The two inputs comprise respectively the terminals 17, 18 and 19, 20. In the embodiment shown, the fine signal voltage which is applied across terminals 17 and 18 appears across potentiometer 23 providing a voltage adjustment. One end of potentiometer 23 is connected through resistor 24 to the plate of an electron tube 25, while the slider on the potentiometer 23 is connected through resistor 26 to the plate of a second electron tube 27. In the preferred arrangement of our invention, these two tubes are connected in push-pull relation, the cathodes thereof being connected together and through biasing resistors 28 and 29 with a suitable source of D. C. supply 30. The plate-cathode circuits of these tubes are completed by the plate resistors 31 and 32 across which the output voltage of these tubes appears. The control electrode or grid circuits of these tubes include the common resistor 28 and, respectively, the secondary windings 33 and 34 of an input transformer 35.

It will be noted that the negative terminal of the D. C. source is connected to a common point between the resistor 28 and the transformer secondaries 33 and 34, while the positive terminal of the D. C. supply is connected to the midpoint between output resistors 31 and 32. This serves to bias both tubes to some predetermined value below cut-off so that they will conduct only when the signal voltage supplied to the grids thereof through the transformer secondaries exceeds some predetermined value as hereinafter more fully pointed out.

The output of the rotor 14 of signal transformer 11 is connected in series with the secondary of transformer 36 across the input terminals 19 and 20. Transformer 36 serves to supply an alternating voltage of substantially constant amplitude which is ordinarily termed an "anti-stick-off voltage" to prevent synchronization of the load in a 180° relation with the reference member which is driven with the input shaft 1. The possibility of synchronization in this manner occurs when an even numbered ratio of fine to coarse data transmission system is used.

In the present illustration, we have assumed a 36:1 ratio and hence utilize an anti-stick-off voltage. Hence, a combined coarse error voltage and anti-stick-off voltage is applied across the input terminals 19 and 20 and across both primary windings 37 and 38 of input transformer 35.

The operation of the voltage mixing circuit above described is as follows. The two tubes 25 and 27 are biased below cut-off and, for example, so biased that for coarse signal voltages representing less than 20 minutes of actual error or angular amount of positional disagreement between the reference member and positionable object, these tubes will not conduct. However, when the actual error represented by the coarse signal voltage does exceed 20 minutes, the bias on these tubes will be overcome and conduction will occur. Therefore, for values of coarse error below a predetermined one, such as 20 minutes, no voltage component corresponding to the coarse error voltage will appear across the output terminals of this circuit but the fine error voltage which is connected to the plates of these tubes and with the output terminals 21 and 22 will be present in the output. As soon as the tubes 25 and 27 conduct, they will serve not only to supply an output voltage component corresponding to the coarse error voltage but also to attenuate the fine error voltage. The time during which these tubes conduct gradually increases as the coarse error voltage increases and hence the effective shunting of the fine signal is not abrupt but also gradually increases as the error increases above the predetermined value, such as 20 minutes. This shunting of the fine error may progressively increase until the fine error voltage component in the output of the circuit is reduced to zero, which may occur at a value of approximately 2° of actual error.

Fig. 3 illustrates the relative magnitude of the envelopes of the voltage components corresponding to fine and coarse signal voltages in the output of our mixing circuit plotted against actual error in degrees. The dotted line 39 represents the fine error voltage component, the dot-dash curve 40 represents the coarse error voltage component, and the full line curve 41 represents the summation of these components or the character of the control voltage employed in controlling the servomotor. Tubes 25 and 27 may, of course, amplify the coarse signal voltage.

Also, it will be noted that signal mixing occurs in such a manner that the resultant control voltage will not decrease materially, as curve 41 indicates, until the 180° error position is reached. However, the slope of curve 41 at or adjacent the 180° error point will be substantially the same or as great as it is at the true reference position, thereby eliminating any possibility of synchronizing at a false point.

Referring again to Fig. 1, in the amplifier or control circuit herein shown, the output of the mixing circuit is supplied through coupling condensers 42 and 43 to the grids of a second stage including electronic tubes 44 and 45. This stage is provided mainly so that the resultant signal voltage may work into a high impedance circuit, and some amplification may be obtained in this stage.

The outputs of tubes 44 and 45 are supplied through coupling transformer 46 to a demodulator 47 which is preferably of a full wave character and may include error rate and error integrating circuits. This demodulator forms no part of the present invention but preferably includes impedance comprising resistance and capacitance connected in inverse feedback circuits to provide error rate and error integral effects in the unidirectional voltage output of the demodulator.

The output of the demodulator is preferably passed through a filter 48 designed to filter out second harmonic components of the signal voltage. Assuming that a 60 cycle signal voltage is employed, filter 48 is designed to filter out the 120 cycle voltage components. If desired, the output of filter 48 may pass through an additional differentiating, or rate taking, circuit 49 which may comprise a conventional resistance-capacitance network, by-passing a component of the control voltage derived from the filter circuit.

The output of the rate circuit 49 is then applied to a modulator 50 which may be of any suitable conventional type. The necessity of demodulating and then modulating occurs when the excitation voltage for the selsyn transmitters does not bear a fixed phase relation with the supply voltage connected to the motor field circuit.

In the embodiment of our invention herein illustrated, the output of modulator 50 is filtered and then applied to a novel circuit or phase-sensitive output stage indicated generally at 100 which permits application of the signal and bias voltages in parallel to the grids of the thyratron tubes 51, 52, which are connected to control the direction and rate of operation of the servomotor indicated generally at 53 in accordance with the phase sense and magnitude of the signal voltage.

In the preferred embodiment of this circuit as shown in Fig. 2, the fixed bias for the tubes 51 and 52 is obtained from a transformer 531, the primary of which is connected across one of the phases of the three-phase A. C. supply 54. The secondary of transformer 531 has its center tap connected to ground and the opposite ends thereof are connected through condensers 55, 56, respectively, and through resistors 57, 58, respectively, with the grids of thyratron tubes 51, 52. These series condensers 55 and 56 are employed in order to permit parallel addition of the bias and signal voltages on the grids of the tubes. The resistors 57 and 58 together with condensers 59 and 60, which are connected to ground, function to prevent oscillations in the grid circuits.

The signal voltage derived from modulator 50 is passed through transformer 61 and then supplied through coupling condenser 62 across a resonant filter circuit 101 including inductance or the choke coil 63 and condenser 64 connected in series therewith. Assuming a 60 cycle control voltage as above assumed, the most objectionable harmonic frequency in the signal is the second harmonic or 120 cycle voltage component. A filter of this type will serve to remove a maximum of the objectionable second harmonic with a minimum amount of phase delay to the 60 cycle control voltage. If a conventional 60 cycle tuned filter were to be employed or a low pass filter, the delay occasioned thereby would nullify to some extent the rate effect derived from the differentiating or rate taking circuits. Hence, with the resonant type of filter shown, a more stable control with less hunting is obtained.

The signal voltage after passing the series resonant filter circuit is applied in in-phase relation through resistors 65 and 66 to the grids of the thyratrons 51 and 52, being preferably connected as shown to points intermediate the condenser 55 and resistor 57 and condenser 56 and resistor 58. The plate potentials are applied, as pointed out in the following, in out-of-phase relation to the plates of the thyratron tubes 51 and 52. Also, the bias potentials derived through transformer 53 are applied in out-of-phase relation. As a result, clean firing of the thyratrons is achieved. Additionally, it will be noted that a path from each grid through resistors, rather than through any transformer's secondaries or filter chokes, exists to ground, thereby minimizing or eliminating pulses in the grid circuits which otherwise would produce poor thyratron operation. The bias supply, since it is derived directly from the power source, will be reasonably free from harmonic distortion, while the harmonics in the signal voltage are filtered out as above described.

The servomotor 53 is indicated as a two-phase, squirrel cage motor, the armature of which drives load shaft 67, which in turn drives the rotors 14 and 15 of the signal transformers 11 and 12 through suitable gearing and shafting indicated generally as 68. The gear train 69 between the rotors 14 and 15 is such as to provide a 36:1 ratio between the fine and coarse transformer rotors or the same ratio as exists between the fine and coarse transmitters. The last-described connection between the servomotor output and the signal transformers provides for zeroing of the control signal when the load or positionable object driven by the servo is in synchronism or positional agreement with the reference member associated with the input shaft 1.

The field windings 70 and 71 of the servomotor, as shown in Fig. 2, are connected across one phase of the three-phase supply 54 and in circuit with the primaries 72 and 73 of transformers 74 and 75, field windings 70 and transformer winding 72 being in series thereacross, while field winding 71 and transformer winding 73 are in series thereacross. A condenser 76 is connected between a point intermediate one of the motor field windings and one of the transformer primary windings and another point intermediate the other motor field winding and the other transformer primary to provide a desired phase quadrature relation between the currents in the two phases of the field windings.

The secondaries 78 and 79 of transformers 74 and 75 are connected together at one of the ends thereof and the other ends are connected respectively to the plates of the thyratron tubes 51 and 52. It will be observed that the transformers are so connected as to supply plate potentials to the tubes 51 and 52 in out-of-phase relationship as hereinabove indicated. The thyratron plate circuits serve to shunt the secondaries of transformers 74 and 75 to variable extents depending upon the conducting conditions of the tubes which, in turn, are dependent upon the magnitude of the signal voltages applied to the grids thereof and the phase sense of said signal voltages with respect to the plate potentials. In other words, a phase-sensitive amplifier results which controls the direction of rotation of the servomotor in accordance with the phase sense of the signal or signals derived from the coarse and fine data transmission systems, and the rate of rotation will be primarily dependent upon the amplitude of these signal voltages.

If the two thyratron tubes fire equally producing equal currents in their plate outputs, the shunting effect of both tubes will be equal with the result that zero differential currents will flow through the field windings of the two phase motor. However, when one of the plate currents predominates over the other, a differential current will flow in the field windings causing the motor to rotate in one direction or the other depending upon which one of the tubes passes the predominating current. For a signal or control voltage of one phase sense, the phase relation of the current in field windings 70, 71 will be of one sense, for example, that in winding 70 leading that in winding 71, and, upon a reversal of the phase sense of the control voltage, the phase relation of the current in these motor field windings will reverse or, in accordance with the above assumption, the current in winding 71 will lead that in winding 70.

While we have described our invention in its preferred embodiments, it is to be understood that the words which we have uesd are words of description rather than of limitation and that changes within the purview of the appended claims may be made without departing from the true scope and spirit of our invention in its broader aspects.

What is claimed is:

1. In a signal voltage mixing system of the character described, a circuit including a pair of output terminals and two pairs of input terminals, a fine and coarse data transmission system including fine and coarse electrical signal transmitters and receivers connected respectively one with the other to provide fine and coarse alternating error signal voltages of like frequency to be mixed, the voltage outputs of said fine and coarse receivers being connected respectively to the two pairs of input terminals, one of said pairs of input terminals being connected to receive the fine signal voltage and being also connected with said output terminals to connect said fine voltage to said output terminals, and a pair of electron tubes each having a control electrode connected to receive the coarse alternating signal voltage and their space discharge paths being connected in push-pull relation across said output terminals, said tubes being energized respectively to conduct on alternate half cycles of the signal voltage when said coarse signal is sufficient to cause conduction such that both tubes will attenuate the fine signal when they conduct; whereby said tubes will provide a voltage across the output terminals proportional to said coarse signal voltage while controlling the magnitude of the fine signal voltage supplied to said output terminals so that the fine signal voltage across said output terminals progressively decreases as said coarse signal voltage increases and causes increased conductance of said tubes.

2. In a signal voltage mixing system of the character described, a circuit including a pair of output terminals and two pairs of input terminals, a fine and coarse data transmission system including fine and coarse electrical signal transmitters and receivers connected respectively one with the other to provide fine and coarse alternating error signal voltages of like frequency to be mixed, the voltage outputs of said fine and coarse receivers being connected respectively to the two pairs of input terminals, one of said pairs of input terminals being connected to receive the fine signal voltage and with said output terminals to supply said fine voltage to said output terminals, and a pair of electron tubes each having a plate, cathode and control electrodes, a source of unidirectional plate voltage connected to said plates, the cathodes being connected together and the plates being connected respectively to the output terminals, and the pair of input terminals to which said coarse signal voltage is supplied being connected with said control electrodes to supply said coarse signal in out-of-phase relation thereto; whereby said tubes will provide a voltage across the output terminals proportional to said coarse signal voltage while controlling the magnitude of the fine signal voltage supplied to said output terminals so that the fine signal voltage across said output terminals progressively decreases as said coarse signal voltage increases and causes increased conductance of said tubes.

3. A system of the character recited in claim 1 further including a bias supply connected with said electron tubes for preventing conduction thereof for small values of coarse signal voltage.

4. A system of the character recited in claim 2 further including means for supplying a bias potential to said electron tubes for rendering them unresponsive to small values of coarse signal voltage.

RAWLEY D. McCOY.
THADDEUS J. KUSTO.

REFERENCES CITED

The following references are of record in the file of this patent:

UNITED STATES PATENTS

| Number | Name | Date |
|---|---|---|
| 1,955,322 | Brown | Apr. 17, 1934 |
| 1,985,982 | Edwards | Jan. 1, 1935 |
| 1,986,644 | Pfister | Jan. 1, 1935 |
| 2,004,107 | Goldsmith | June 11, 1935 |
| 2,004,128 | Peterson | June 11, 1935 |
| 2,010,577 | Wilson | Aug. 6, 1935 |
| 2,037,865 | Potter | Apr. 21, 1936 |
| 2,084,457 | Schott | June 22, 1937 |
| 2,235,551 | Garman | Mar. 18, 1941 |
| 2,247,468 | Barr et al. | July 1, 1941 |
| 2,287,334 | White | June 23, 1942 |
| 2,323,966 | Artzt | July 13, 1943 |
| 2,407,876 | Godet | Sept. 17, 1946 |
| 2,409,970 | Agins | Oct. 22, 1946 |
| 2,411,608 | Lesnick | Nov. 26, 1946 |
| 2,423,228 | Conklin | July 1, 1947 |
| 2,424,350 | Cawein | July 22, 1947 |
| 2,424,568 | Isbister et al. | July 29, 1947 |
| 2,429,636 | McCoy | Oct. 28, 1947 |
| 2,432,302 | Fisher | Dec. 9, 1947 |
| 2,435,926 | Krupick | Feb. 10, 1948 |
| 2,446,532 | Edwards | Aug. 10, 1948 |
| 2,448,387 | Newell et al. | Aug. 31, 1948 |
| 2,511,863 | McCoy | June 20, 1950 |
| 2,561,654 | Eller | July 24, 1951 |